United States Patent
Chien et al.

(10) Patent No.: US 7,890,132 B2
(45) Date of Patent: *Feb. 15, 2011

(54) SYSTEMS AND METHODS FOR CALIBRATING POWER REGULATED COMMUNICATION CIRCUITRY

(75) Inventors: George Chien, Cupertino, CA (US); King Chun Tsai, San Jose, CA (US); Sang Won Son, Sunnyvale, CA (US); Alireza Shirvani Mahdavi, San Jose, CA (US); Qiong Sun, Fremont, CA (US); Leycheoh Lim, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/775,694

(22) Filed: May 7, 2010

(65) Prior Publication Data

US 2010/0220243 A1 Sep. 2, 2010

Related U.S. Application Data

(63) Continuation of application No. 11/437,560, filed on May 19, 2006, now Pat. No. 7,738,904.

(60) Provisional application No. 60/695,342, filed on Jun. 30, 2005, provisional application No. 60/708,901, filed on Aug. 17, 2005, provisional application No. 60/775,965, filed on Feb. 22, 2006, provisional application No. 60/798,270, filed on May 4, 2006.

(51) Int. Cl.
  *H04B 7/00* (2006.01)

(52) U.S. Cl. .................................................. 455/522
(58) Field of Classification Search ................ 455/522, 455/522.1, 13.4, 77
  See application file for complete search history.

(56) References Cited

U.S. PATENT DOCUMENTS

| | | | |
|---|---|---|---|
| 6,920,334 B1* | 7/2005 | Karsi et al. .................. | 455/522 |
| 7,433,658 B1 | 10/2008 | Shirvani et al. | |
| 2001/0019943 A1* | 9/2001 | Bender et al. ............... | 455/13.4 |
| 2005/0186982 A1* | 8/2005 | Chen et al. ................... | 455/522 |
| 2006/0183495 A1* | 8/2006 | Soliman ...................... | 455/522 |

* cited by examiner

*Primary Examiner*—Matthew D Anderson
*Assistant Examiner*—David Bilodeau

(57) ABSTRACT

Systems and methods are provided for calibrating the control mechanism in a communication circuit to allow the communication circuit to maintain a desired output power level. The communication circuit includes a variable gain adjustment circuit and a power amplifier, which operate together to provide an output power level. A control circuit controls the variable gain adjustment circuit based on a default gain parameter, a high power threshold, and a low power threshold. A calibration circuit in the control circuit calibrates a default gain parameter to provide a desired output power. A power detector can detect the desired output power level to provide an output power measurement. The calibration circuit calibrates upper and lower power thresholds to provide an acceptable range of power variation around the output power measurement.

19 Claims, 16 Drawing Sheets

SYSTEMS AND METHODS FOR CALIBRATING POWER REGULATED COMMUNICATION CIRCUITRY

CROSS-REFERENCE TO RELATED APPLICATIONS

This application is a continuation of U.S. patent application Ser. No. 11/437,560, filed May 19, 2006, which claims the benefit under 35 U.S.C. §119(e) of U.S. Provisional Application No. 60/695,342, filed Jun. 30, 2005, U.S. Provisional Application No. 60/708,901, filed Aug. 17, 2005, U.S. Provisional Application No. 60/775,965, filed Feb. 22, 2006, and U.S. Provisional Application No. 60/798,270, filed May 4, 2006, which are incorporated herein by reference in their entirety.

BACKGROUND OF THE INVENTION

This invention generally relates to wireless communication circuitry and more particularly to systems and methods for calibrating the output power control system in a wireless communication circuit.

Wireless communication devices generally operate based on power requirements defined by government regulations or industry standards. Such standards and regulations may require a wireless communication device to produce signals having a prescribed power level. Additionally, communication device manufactures may also have reasons to produce signals having particular power levels.

Several factors may affect the output power level of a wireless communication device. These factors include variations in the communication device's component parts, changes in antenna impedance, and changes in environmental conditions, for example. Such factors may cause the output power of the output power level to wander from a prescribed/target power level. Therefore, many communication devices include control mechanisms to ensure that a prescribed/target power level is maintained in a communication device.

Typically, the control mechanism of a communication device needs to be calibrated before it can be used in operation. The control mechanism may include various operating parameters, and the calibration process may involve initialing these parameters to their correct starting values, which in some cases can be an iterative process. The calibration process can be even more time consuming when a communication device operates at multiple power levels. For such communication devices calibration may need to be performed for each power level.

Even though calibration can be time consuming, it is an important quality control measure to ensure that a communication device will operate at the correct power levels. Accordingly, there is continuing interest in improving calibration processes and in reducing calibration times.

SUMMARY OF THE INVENTION

The disclosed technology provides systems and methods for calibrating the control mechanism of a communication circuit to allow the communication circuit to maintain a desired output power level. The communication circuit includes a variable gain adjustment circuit and a power amplifier, which operate together to provide an output power level. A feedback loop from the output power level to the variable gain adjustment circuit includes a power detector and a control circuit. The control circuit controls the variable gain adjustment circuit based on a default gain parameter, a high power threshold, and a low power threshold. A calibration circuit in the control circuit calibrates the default gain parameter to provide a desired output power when the feedback loop is disabled. The power detector can detect the desired output power level to provide an output power measurement. With the feedback loop enabled, the calibration circuit calibrates the upper and lower power thresholds to provide an acceptable range of power variation around the output power measurement.

In one aspect of the invention; a default gain adjustment circuit can configure the default gain parameter to provide a desired output power level while the feedback loop is disabled. The default gain adjustment circuit can calibrate the default gain parameter based on knowing an input-output relationship for the power detector. Additionally, the default gain parameter can have a linear relationship with the output power. Accordingly, the default gain adjustment circuit can adjust the default gain parameter based on the linear relationship until it determines that the output power matches a desired output power level.

The power detector can measure the desired output power level to provide an output power measurement. A threshold adjustment circuit in the calibration circuit can calibrate the upper power threshold and the lower power threshold by setting them to initial values and enabling the feedback loop. The control circuit can adjust a gain tuning parameter based on comparing the output power measurement with the upper and lower thresholds. The threshold adjustment circuit can use the gain tuning parameter to adjust the upper and lower thresholds during calibration. A tuning access circuit can be in communication with the gain tuning parameter. In one embodiment, the threshold adjustment circuit can use a table of adjustment values to adjust the upper and lower thresholds according to a predetermined progression. For an iteration, the table of adjustment values can contain the values $$\left[\frac{1}{3}(P_{upper} - P_{lower})\right], \left[\frac{2}{3}(P_{upper} - P_{lower})\right],$$
$$(P_{upper} - P_{lower}), \text{ and } \left[\frac{4}{3}(P_{upper} - P_{lower})\right],$$

wherein $(P_{upper} - P_{lower})$ is the difference between the threshold values in a previous iteration. In one embodiment, the threshold adjustment can be iterative.

In one aspect of the invention, the threshold adjustment circuit can iteratively adjust the upper and lower power thresholds. In each iteration, the threshold adjustment circuit can maintain a threshold value range that includes the upper and lower power thresholds. The threshold value range can be sub-divided into three sub-ranges that include top, middle, and bottom sub-ranges. The boundaries between the sub-ranges corresponds to the upper and lower power thresholds. The tuning access circuit can access the gain tuning parameter. If the gain tuning parameter is less than an initial tuning value, the threshold adjustment circuit can select the top sub-range as the threshold value range for the next iteration. If the gain tuning parameter is equal to the initial tuning value, the threshold adjustment circuit can select the middle sub-range as the threshold value range for the next iteration. If the gain tuning parameter is greater than an initial tuning value, the threshold adjustment circuit can select the bottom sub-range as the threshold value range for the next iteration. The calibration circuit can adjust the upper and lower power thresholds to be within the selected sub-range.

In one aspect of the invention, a calibration means in a control means calibrates the default gain parameter to provide a desired output power when the feedback loop is disabled. A power detector means can detect the desired output power level to provide an output power measurement. With the feedback loop enabled, the calibration means calibrates the upper and lower power thresholds to provide an acceptable range of power variation around the output power measurement.

A default gain calibration means can configure the default gain parameter to provide a desired output power level while the feedback loop is disabled. A calibration means can calibrate the default gain parameter based on knowing an input-output relationship for the power detector means. Additionally, the default gain parameter can have a linear relationship with the output power. Accordingly, the calibration means can adjust the default gain parameter based on the linear relationship until it determines that the output power matches a desired output power level.

The power detector means can measure the desired output power level to provide an output power measurement. The calibration means can calibrate the upper power threshold and the lower power threshold by setting them to initial values, and enabling the feedback loop. The control means can adjust a gain tuning parameter based on comparing the output power measurement with the upper and lower thresholds. The calibration means can use the gain tuning parameter to adjust the upper and lower thresholds during calibration. In one embodiment, the calibration means can use a table of adjustment values to adjust the upper and lower thresholds according to a predetermined progression. For an iteration, the table of adjustment values can contain the values $$\left[\frac{1}{3}(P_{upper} - P_{lower})\right], \left[\frac{2}{3}(P_{upper} - P_{lower})\right], (P_{upper} - P_{lower}),$$

and $$\left[\frac{4}{3}(P_{upper} - P_{lower})\right],$$

wherein ($P_{upper}$−$P_{lower}$) is the difference between the threshold values in a previous iteration. In one embodiment, the threshold adjustment can be iterative.

In one aspect of the invention, the calibration means can iteratively adjust the upper and lower power thresholds. In each iteration, the calibration means can maintain a threshold value range that includes the upper and lower power thresholds. The threshold value range can be sub-divided into three sub-ranges that include top, middle, and bottom sub-ranges. The boundaries between the sub-ranges corresponds to the upper and lower power thresholds. If the gain tuning parameter is less than an initial tuning value, the calibration means can select the top sub-range as the threshold value range for the next iteration. If the gain tuning parameter is equal to the initial tuning value, the calibration means can select the middle sub-range as the threshold value range for the next iteration. If the gain tuning parameter is greater than an initial tuning value, the calibration means can select the bottom sub-range as the threshold value range for the next iteration. The calibration means can adjust the upper and lower power thresholds to be within the selected sub-range.

In one aspect of the invention, a calibration program running on a processor can calibrate the default gain parameter to provide a desired output power when the feedback loop is disabled. A power detector can detect the desired output power level to provide an output power measurement. With the feedback loop enabled, a calibration program running on a processor can calibrate the upper and lower power thresholds to provide an acceptable range of power variation around the output power measurement.

A default gain calibration program running on a processor can configure the default gain parameter to provide a desired output power level while the feedback loop is disabled. A calibration program can calibrate the default gain parameter based on knowing an input-output relationship for the power detector. Additionally, the default gain parameter can have a linear relationship with the output power. Accordingly, the calibration program can adjust the default gain parameter based on the linear relationship until it determines that the output power matches a desired output power level.

The power detector can measure the desired output power level to provide an output power measurement. The calibration program running on a processor can calibrate the upper power threshold and the lower power threshold by setting them to initial values and enabling the feedback loop. A control program running on a processor can adjust a gain tuning parameter based on comparing the output power measurement with the upper and lower thresholds. The calibration program can use the gain tuning parameter to adjust the upper and lower thresholds during calibration. In one embodiment, the calibration program can use a table of adjustment values to adjust the upper and lower thresholds according to a predetermined progression. For an iteration, the table of adjustment values can contain the values $$\left[\frac{1}{3}(P_{upper} - P_{lower})\right], \left[\frac{2}{3}(P_{upper} - P_{lower})\right],$$

$$(P_{upper} - P_{lower}), \text{ and } \left[\frac{4}{3}(P_{upper} - P_{lower})\right],$$

wherein ($P_{upper}$−$P_{lower}$) is the difference between the threshold values in a previous iteration. In one embodiment, the threshold adjustment can be iterative.

In one aspect of the invention, the calibration program can iteratively adjust the upper and lower power thresholds. In each iteration, the calibration program can maintain a threshold value range that includes the upper and lower power thresholds. The threshold value range can be sub-divided into three sub-ranges that include top, middle, and bottom sub-ranges. The boundaries between the sub-ranges corresponds to the upper and lower power thresholds. If the gain tuning parameter is less than an initial tuning value, the calibration program can select the top sub-range as the threshold value range for the next iteration. If the gain tuning parameter is equal to the initial tuning value, the calibration program can select the middle sub-range as the threshold value range for the next iteration. If the gain tuning parameter is greater than an initial tuning value, the calibration program can select the bottom sub-range as the threshold value range for the next iteration. The calibration program can adjust the upper and lower power thresholds to be within the selected sub-range.

Further features of the invention, its nature and various advantages, will be more apparent from the accompanying drawings and the following detailed description of the various embodiments.

DETAILED DESCRIPTION

Figure 1:
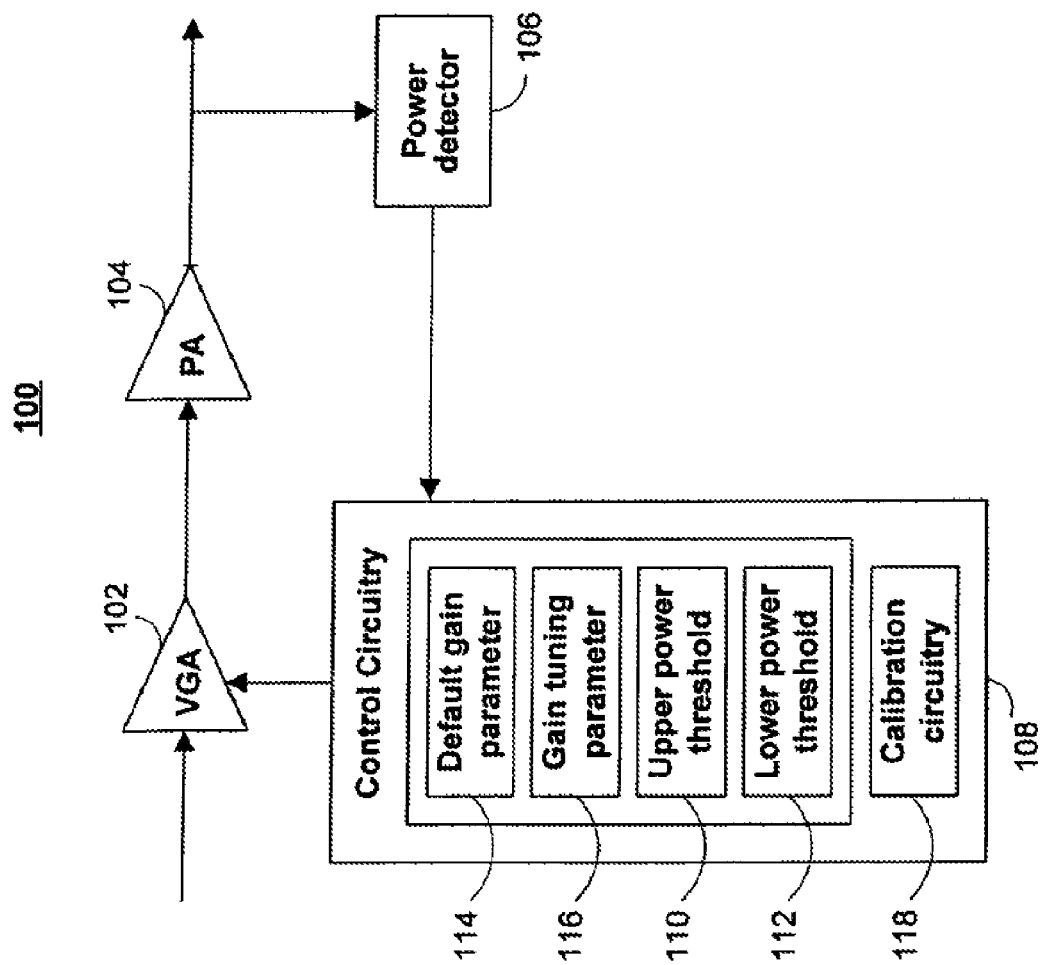
FIG. 1 is a block diagram of an exemplary communication circuit in accordance with one aspect of the invention.

Referring to FIG. 1, there is shown a block diagram of one embodiment of a communication circuit 100 in accordance with one aspect of the invention. The communication circuit 100 includes a variable gain adjustment (VGA) circuit 102 and a power amplifier 104. As used herein, a variable gain adjustment circuit 102 refers to a circuit that operates to receive an input signal and that is operable to adjust an amplitude of the input signal. The adjustment may increase the amplitude, which is referred to as gain, or may decrease the amplitude, which is referred to as attenuation. Attenuation produces the opposite effect of gain and therefore can essentially be characterized as "negative gain." Accordingly, the term "variable gain adjustment" as used herein refers generally to signal adjustment that can correspond to positive gain or negative gain (i.e., attenuation). As used herein, the term "power amplifier" refers to a circuit that receives an input signal and that is operable to increase the power of the input signal. A variable gain adjustment circuit 102 and a power amplifier 104 can be implemented using existing technology that will be known to one skilled in the art.

A VGA circuit 102 can be used to regulate the output power to remain within a desirable range of output power levels. In one embodiment, a power amplifier 104 can also be adjusted as required to regulate output power. One way to control the output power may be by varying the gain of the VGA circuit 102. In one embodiment of a VGA circuit 102, each discrete step adjustment in the gain may correspond to a discrete change in output power level at the output of the power amplifier 104. In one example, a single step increase in the gain of the VGA circuit 102 may result in a 0.5 dB increase in output power level.

The communication circuit 100 includes a feedback loop from the output of the power amplifier 104 to the variable gain adjustment circuitry 102. The feedback loop operates to control the VGA circuit 102 in a way that regulates the output power level. The feedback loop includes a power detector circuit 106 connected to the output of the power amplifier that can provide a measurement of the output power. A control circuit 108 in the feedback loop receives the output power measurement and makes a determination regarding whether the measurement is acceptable. If the measurement is not acceptable, the control circuit 108 can adjust the VGA circuit 102 to provide an appropriate amount of signal adjustment that will result in an acceptable output power level. From hereon, the power level at the output of the power amplifier 104 will be referred to herein as "true output power" and the measurement provided by the power detector will be referred to as an "output power measurement." The determination of whether or not a output power measurement corresponding to a true output power is acceptable will be described in more detail in connection with FIG. 3.

An output power measurement can depend on various factors, such as the time and duration over which true output power is measured and the methods used by the power detector for making such a measurement. In one example of measurement timing, a signal at the output of the power amplifier 104 may represent digital information in the format of packets. In one embodiment, some degree of consistency between measurements can be provided by measuring the true output power over the duration of a packet communication. In one embodiment, several instances of the true output power can be measured and averaged to provide an averaged output power measurement. In various embodiments, the output power measurement may be a DC, pseudo-DC or a low frequency signal. One embodiment of a power detector is described in U.S. patent application Ser. No. 10/673,263, filed Sep. 30, 2003, which is hereby incorporated herein by reference in its entirety.

Figure 2:
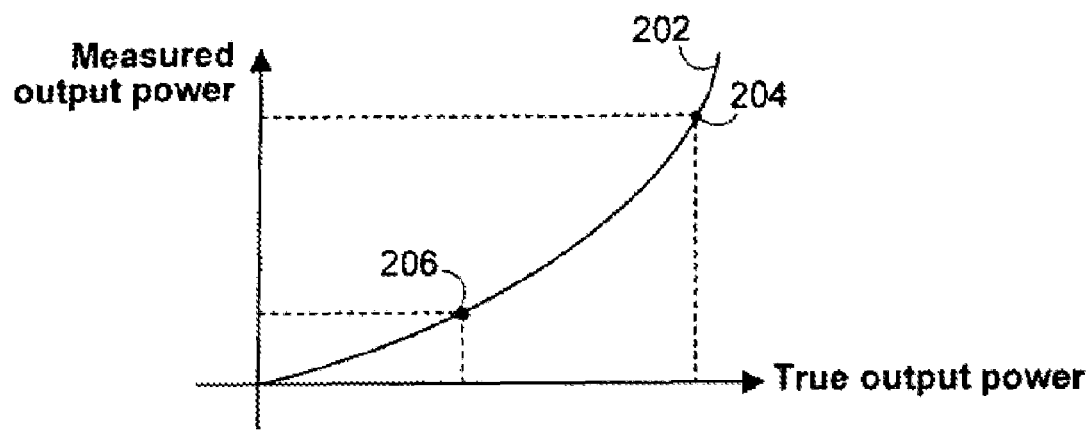
FIG. 2 is a graph of an exemplary input-output relationship of the power detector of FIG. 1.

FIG. 2 shows one embodiment of an input-output relationship for a power detector circuit 106. As previously described herein, the power detector 106 can measure the true output power to provide an output power measurement. FIG. 2 shows an exponential relationship 202 between the output power measurement and the output voltage.

A non-linear relationship 202 between true output power and the output power measurements may complicate the control mechanism. For example, in the illustrated relationship 202 of FIG. 2, variation in the true output power for higher true output power values 204 will result in larger variations in the output power measurements, whereas the same variations in the true output power for lower true output power values 206 will result in smaller variations in the output power measurements. A control circuit may or may not take this non-linearity into consideration. FIG. 2 is exemplary and other input-output relationship for a power detector are contemplated. For example, in some embodiments, the relationship between the measured output power and the true output power can be linear or can correspond to another relationship such as a higher-order polynomial.

Referring again to FIG. 1, the control circuit 108 can receive an output power measurement from the power detector 106 and make a determination regarding whether the output power measurement is acceptable. In the illustrated embodiment and in accordance with one aspect of the invention, the determination of acceptability of the output power measurement can be based on an upper power threshold 110 and a lower power threshold 112. Also with reference to FIG. 3, an output power measurement provided by a power detector 106 can have a maximum value $PD_{max}$ and a minimum value $PD_{min}$. The upper power threshold $P_{upper}$ 110 and the lower power threshold $P_{lower}$ 112 can define a particular range of values in the output power measurement range in which the output power measurement is acceptable. If the output power measurement varies within this range, the control circuit 108 can maintain the VGA circuit 102 at its existing configuration. However, if the output power measurement wanders outside of this range, the control circuit 108 can adjust the VGA circuit 102 to force the output power measurement back into the acceptable range. For example, if the output power measurement is greater than $P_{upper}$ 110, the control circuit 108 can reduce the gain in the VGA circuit 102 to lower the true output power, and if the output power measurement is less than $P_{lower}$ 112, the control circuit 108 can increase the gain in the VGA circuit 102 to increase the true output power.

The use of an upper power threshold 110 and a lower power threshold 112 allows the control circuit 106 to avoid unnecessarily adjusting the VGA circuit 102. As previously described herein, true output power can be measured over the duration of a packet. The measurements can vary from one packet to another because of variations in the content of the packet. By providing an upper power threshold 110 and a lower power threshold 112, the control circuit 108 can allow for measurement variations that flow from the natural operation of the communication circuit 100, which are not variations that need to be corrected. A benefit of using two thresholds over using only a single threshold is that the control circuitry 108 will not need to constantly adjust the VGA circuitry 102 if the output power measurement oscillates minutely around a desired output power level.

Figure 3:
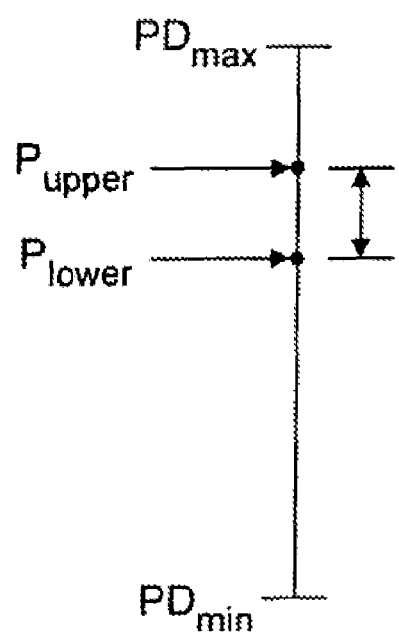
FIG. 3 is a graph of an exemplary region defined by upper and lower power thresholds.

Referring again to FIG. 1 and in accordance with one aspect of the invention, the control circuit 108 can control the VGA circuitry 102 based on a default gain parameter 114 and a gain tuning parameter 116. The control circuitry 108 can use the default gain parameter 114 to provide a baseline level of gain at the VGA circuit 102. When the control circuitry 108 is first calibrated, the default gain parameter 114 can be configured to provide a desired true output power level, which can correspond to a output power measurement within the acceptable range (e.g., as shown in FIG. 3). After calibration, the default gain parameter 114 can remain unchanged, but the output power measurements can wander outside the acceptable range (e.g., as shown in FIG. 3) because of various factors (e.g., environmental conditions) in or affecting the communication device 100.

The control circuit 108 can use the gain tuning parameter 116 to adjust the VGA circuit 102 when the output power measurements become unacceptable. In one embodiment, the control circuit 108 can control the VGA circuit 102 based on a sum of the default gain parameter 114 and the gain tuning parameter 116. The gain tuning parameter 114 can be set to an initial value during calibration. After calibration, the control circuit 108 can increase the gain tuning parameter 116 to increase the gain of the VGA circuit 102 or decrease the gain tuning parameter 116 to decrease the gain of the VGA circuit 102. In one embodiment, the communication device 100 can be configured so that discrete changes in the gain tuning parameter 116 correspond to discrete changes in the true output power. For example, the communication device 100 can be configured so that each increase of one step in the gain tuning parameter 116 results in approximately 0.5 dBm change in the true output power, and each decrease of one step in the gain tuning parameter 116 results in approximately a −0.5 dBm change in the true output power. In other embodiments, the change in true output power in relation to a change in the gain tuning parameter 116 may have a different proportion or may not be linear.

What has been described thus far are systems and methods for controlling a communication circuit to provide a desired output power level. The control circuit 108 provides the control operation based on an upper power threshold 110, a lower power threshold 112, a default gain parameter 114, and a gain tuning parameter 116, which can be stored in memory registers in the control circuit 108. In certain embodiments, the default gain parameter 114 and/or the gain tuning parameter 116 can be stored in the variable gain adjustment (VGA) circuit 102, and the control circuit 108 can access the VGA circuit 102 to access their values. The values of the default gain parameter 114, the upper power threshold 110, and the lower power threshold 112 can be determined during a calibration process for a particular desired output power level. In one embodiment, a communication circuit 100 may operate at different power levels if multiple communication channels are available. As used herein, a "channel" refers to communication using a particular frequency. A communication device 100 can be capable of operating at different frequencies so that one communication device 100 can be used for communications over multiple channels. Different channels may have different output power level requirements. In one embodiment, calibration is performed for one output power level for one channel at a time. In other embodiments, calibration can be performed simultaneously for more than one channel.

FIGS. 4-11 will now describe the calibration process for determining the values of the default gain parameter, the upper power threshold, and the lower power threshold for one output power level for a single channel. At least a portion of the following aspects of the invention can be performed by a calibration circuit 118. In one embodiment, as illustrated in FIG. 1, the calibration circuit 118 can be located in the control circuitry 108. In other embodiments (not shown), the calibration circuitry need not be in the control circuitry 108 and can be located in another portion of the communication circuit 100. In yet another embodiment (not shown), the calibration circuitry 108 may not be located in the communication circuit 100 and may be connected or coupled to the communication circuit 100 when calibration needs to be performed.

Figure 4:
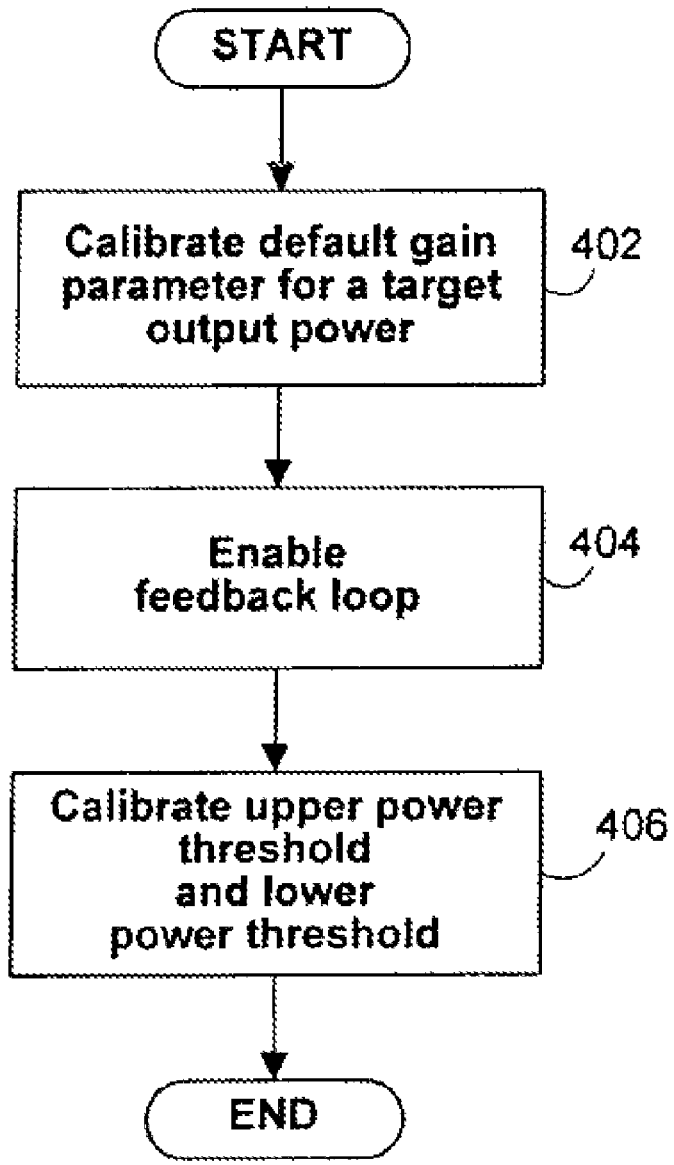
FIG. 4 is a flow diagram of one embodiment of calibrating the control circuitry of FIG. 1.

Referring now to FIG. 4, there is shown one aspect of the invention for calibrating the default gain parameter, the upper power threshold, and the lower power threshold. In the illustrated embodiment, the calibration begins by calibrating the default gain parameter for a desired true output power level 402. During this portion 402 of the calibration, the feedback loop can be disabled by, for example, maintaining the gain tuning parameter at an initial tuning value (e.g., zero). Therefore, the gain tuning parameter does not react to any changes in the output power measurement, and any changes in the true output power is based only on the default gain parameter. Calibration of the default gain parameter is described in more detail in connection with FIG. 5. After the default gain parameter is calibrated, the communication circuit will be configured to provide a desired true output power level. Using the calibrated default gain parameter, the control circuit can enable the feedback loop 404 and calibrate the high power threshold value and the low power threshold value 406. This calibration is described in more detail in connection with FIGS. 6-11. The calibration process can finish after these three parameters are calibrated.

Figure 5:
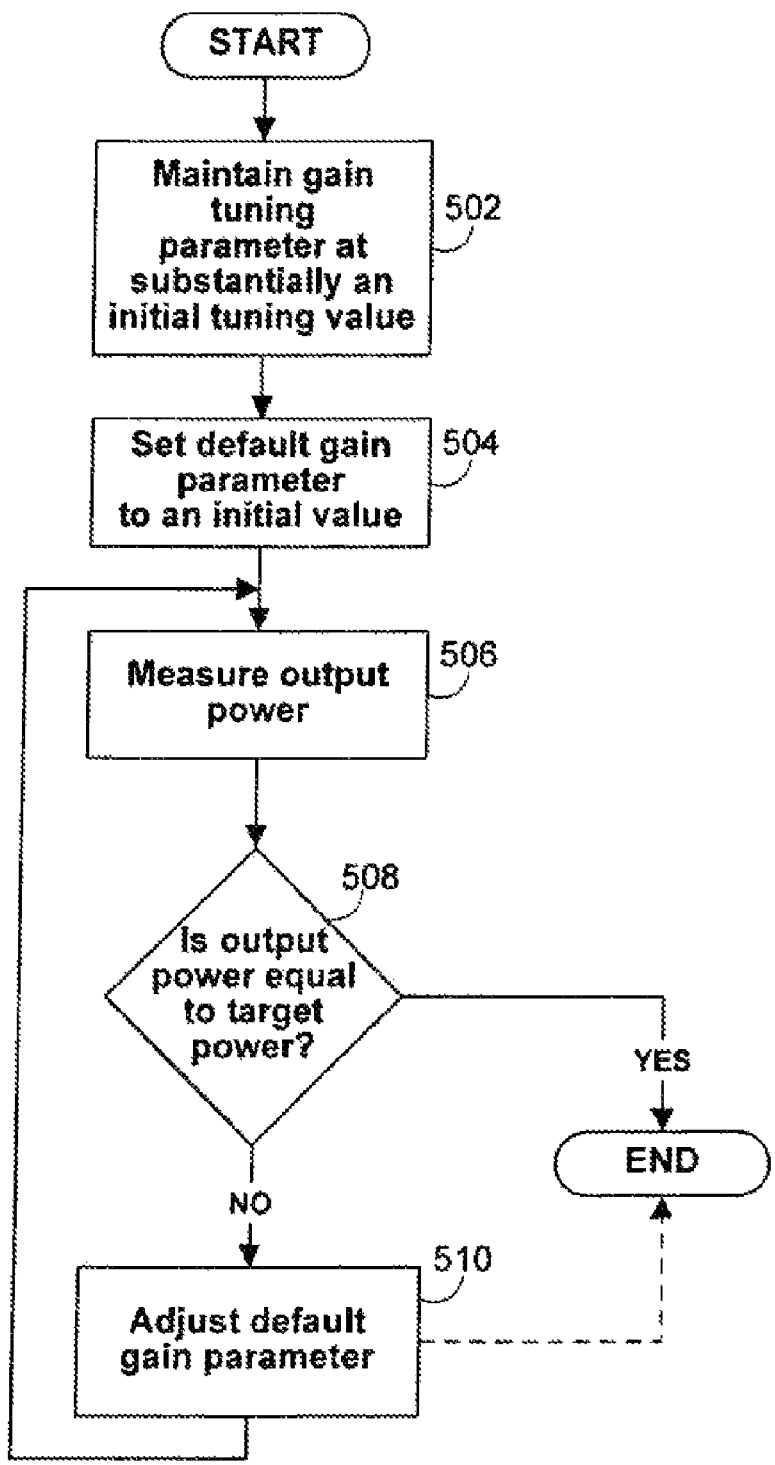
FIG. 5 is a flow diagram of one embodiment of calibrating a default gain parameter.

Referring now to FIG. 5, one embodiment of calibrating a default gain parameter is shown. Calibration of the default gain parameter may be needed because a particular value of the default gain parameter may not always correspond to a particular true output power. This can be caused by variations in the manufacturing process or by variations from component to component. For example, a first communication device according to FIG. 1 may be able to produce twenty dBm of true output power using a default gain parameter of five. However, a second communication device according to FIG. 1 may produce only nineteen dBm using a default gain parameter of five. Although such variations exist, the value of the default gain parameter for a particular true output power level will generally be similar between devices. Accordingly, an initial value can generally be estimated for the default gain parameter.

The calibration process can disable the feedback loop by, for example, maintaining the gain tuning parameter at substantially an initial tuning value when calibrating the default gain parameter 502, and the default gain parameter can be set to an initial value 504. The true output power at the output of the power amplifier can be measured 506, and if the true output power is substantially equal to a desired output power level 508, the calibration is complete. However, if the true output power is not the same as the desired output power 508, the calibration circuit can adjust the default gain parameter to produce the desired output power 510. As described above herein, the communication circuit can be configured so that each discrete change in the default gain parameter corresponds to a discrete change in the true output power. The calibration circuit may know this relationship. Therefore, the calibration circuit can change the default gain parameter by the proper amount to adjust the true output power 510. In one embodiment, the discrete change in the true output power may be limited by the step size of the VGA circuit. For example, the desired output may be twenty dBm, and a default gain parameter value of five may provide nineteen dBm of true output power. The calibration circuit may know that each change of 0.1 in the default gain parameter produces a 0.5 dBm change in the true output power. Therefore, the calibration circuit can increase the default gain parameter to 5.2 to provide a true output power of twenty dBm. In one embodiment, the calibration circuit can take additional measurements of the true output power 506 to ensure that the adjustment was correct 508 and can make further adjustments 510 if necessary. In one embodiment, the calibration circuit may make only one adjustment to the default gain parameter 510.

In one embodiment, if the calibration circuit knows the relationship between the true output power and the output power measurements (e.g., FIG. 2), the calibration circuit can determine the value of the true output power based on the output power measurements. In one embodiment, the input-output relationship of the power detection (e.g., FIG. 2) can be stored as a table in a memory in the calibration circuit, and the power detector (FIG. 1, 106) can be calibrated to operate in accordance with this relationship. In one embodiment, if the calibration circuit does not know the relationship (e.g., FIG. 2), the calibration circuit can be configured to know the input-output relationship of a standardized laboratory power meter. Such a standardized laboratory power meter can be used to measure the true output power, and an output power measurement can be communicated to the calibration circuit. In one embodiment, the input-output relationship of the standardized laboratory power meter can be stored as a table in a memory in the calibration circuit. Based on the known input-output relationship for the standardized power meter, the calibration circuit can determine the true output power using the output power measurement. The calibration circuit can then, adjust the default gain parameter accordingly 510.

Figure 6:
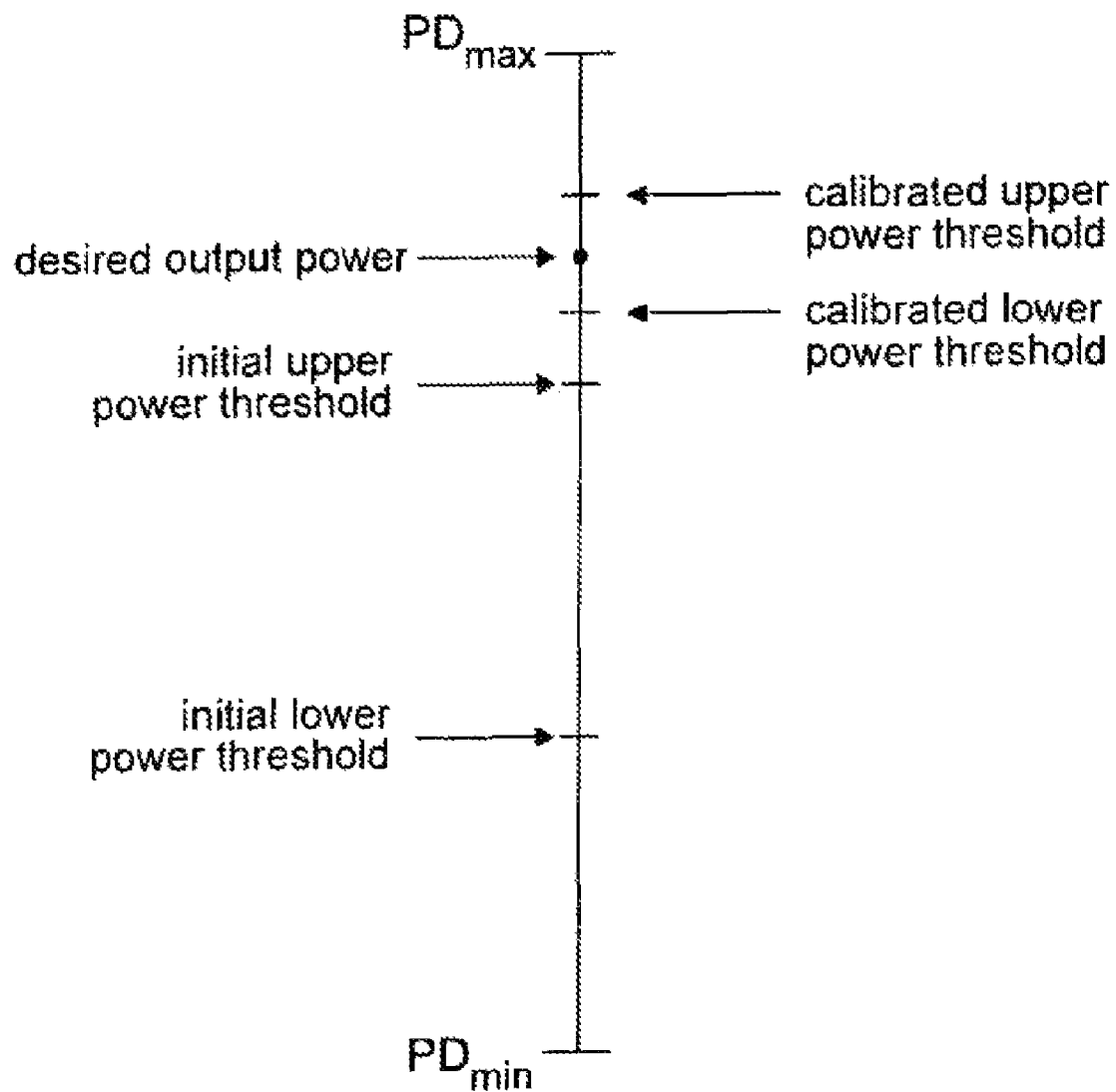
FIG. 6 is a diagram of exemplary upper and lower threshold values before and after calibration.

FIGS. 6-11 illustrate various aspects of calibrating an upper power threshold and a lower power threshold value in accordance with aspects of the invention. FIG. 6 shows the output power measurement range previously shown in FIG. 3. After calibrating the default gain parameter, the default gain parameter operates to provide a desired output-power measurement, as shown in FIG. 6. The process of calibrating the upper power threshold and the lower power threshold determines the placement of the threshold values around the desired output power measurement that would allow the control circuit to regulate the true output power. In the illustrated embodiment of FIG. 6, the upper power threshold and the lower power threshold can be set to initial values. During calibration, the threshold values can be changed to become the calibrated threshold values shown in FIG. 6.

Figure 7A:
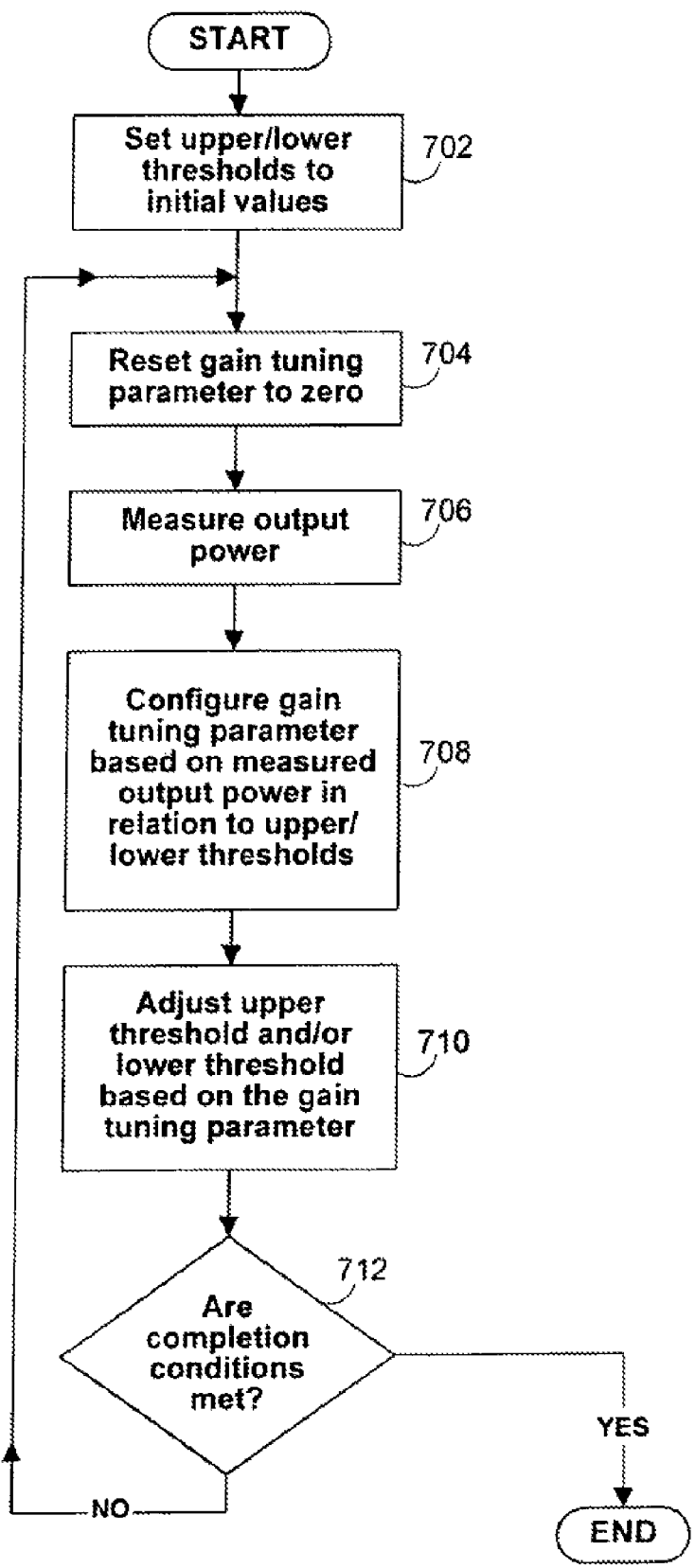
FIG. 7A is a flow diagram of one embodiment of calibrating upper and lower power threshold values.

FIG. 7A shows one embodiment of calibrating the upper and lower threshold values. As described above herein, the upper and lower threshold values can be set to initial values 702, and the gain tuning parameter is equal to an initial tuning value. From hereon, it will be assumed that the initial tuning value is zero 704. The feedback loop can be enabled so that the control circuit can use the thresholds to determine if the output power measurement is acceptable (i.e., between the threshold values) 706. If the output power measurement is not acceptable, the natural operation of the feedback loop can cause the control circuit to adjust the gain tuning parameter 708 to adjust the output power measurement towards the acceptable range.

It is important to recognize here that, before calibrating the upper and lower power thresholds, the calibrated default gain parameter together with a gain tuning parameter value of zero produced the desired output power measurement. Therefore, in one embodiment, one calibration completion condition can require the gain tuning parameter to be zero. This condition will be described in more detail in connection with FIG. 11.

The gain tuning parameter can also serve another role. In one embodiment, the calibration circuit can adjust the upper power threshold and the lower power threshold based on the gain tuning parameter 710. If the gain tuning parameter is greater than zero, that is an indication that the desired output power measurement was less than the lower power threshold. Accordingly, the calibration circuit can decrease the lower power threshold. At the same time, the calibration circuit can also decrease the upper power threshold 710. On the other hand, if the gain tuning parameter is less than zero, that is an indication that the desired output power measurement was greater than the upper power threshold. Accordingly, the calibration circuit can increase the upper power threshold. At the same time, the calibration circuit can also increase the lower power threshold 710. In one embodiment, the amount of each adjustment 710 can be made based on a predetermined progression, which will be described in more detail in connection with FIG. 7B and FIG. 8. The predetermine progression can be implemented by hardware circuitry, by computer instructions executing on a processor, or by a combination thereof. In one embodiment, one or more aspects of the predetermined progression can be stored in a memory (not shown), which can be accessed by the hardware circuitry and/or a processor. The memory may be in the communication circuit (100, FIG. 1) or may be separate from the communication circuit.

After the upper and lower threshold values are adjusted 710, the calibration circuit can determine if one or more completion conditions are met 712. As described above herein, one completion condition can require the gain tuning parameter to be zero. In one embodiment, another completion condition can require the upper and lower threshold values to have a particular difference or to have at least or at most a particular difference. If the completion conditions are not met, the threshold calibration process can be repeated by resetting the gain tuning parameter to zero 704 and allowing the feedback loop to operate using the updated threshold values 706-708. In one embodiment, a completion condition can be met following a certain number of repetitions of the threshold calibration process.

Figure 7B:
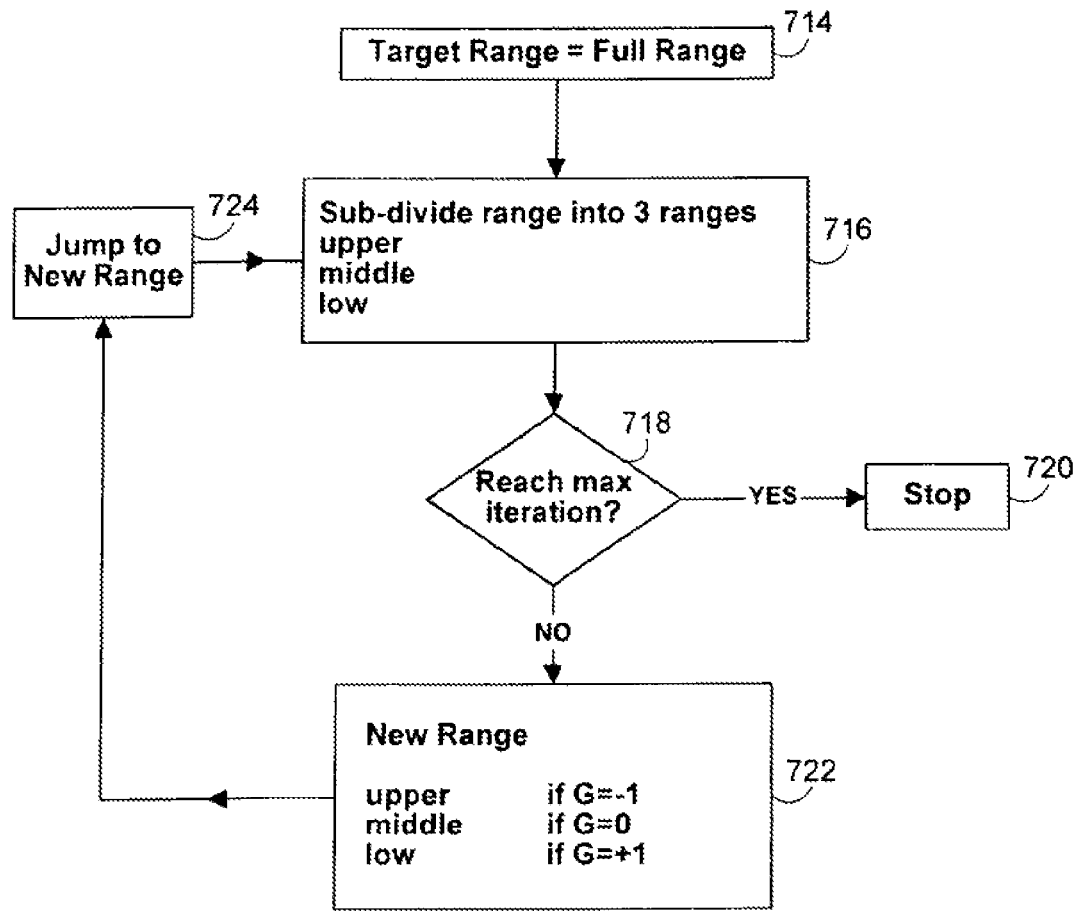
FIG. 7B is a flow diagram of one embodiment of adjusting threshold values.

FIG. 7B illustrates one embodiment of adjusting threshold values. The output power measurement range (e.g., output power measurement range of FIG. 6) can be set as the full range of allowable output power values 714. The full range of allowable output power values can depend on many factors; including hardware limitations and communication channel restrictions. The initial upper and lower threshold values are selected from this output power measurement range. Final upper and lower threshold values also fall within this output power measurement range. The output power measurement range extends from a minimum output power to a maximum output power and is divided into sub-ranges 716. Each sub-range comprises a plurality of output power values and can be classified as an upper, middle or lower range. In one embodiment (e.g., shown in FIG. 8), each sub-range is a third of the output power measurement range. During threshold calibration, initial values for upper and lower, thresholds are selected from the output power measurement range. In one embodiment, the initial upper threshold value is the output power value on the boundary between the upper and middle sub-range. In such an embodiment, the lower threshold value is the output power value on the boundary between the lower and middle sub-range. In each iteration of the threshold calibration process of FIG. 7A, the threshold values are updated depending on at least the measured output power and the gain tuning parameter. As noted earlier, a completion condition can be met if a certain number of iterations of the threshold calibration process have been completed 718. If the completion conditions are met, the threshold calibration process is stopped 720. If the completion conditions are not met and the certain number of iterations has, not been completed, the upper and low threshold values are adjusted based, at least in part, on the value of the gain tuning parameter.

If the gain tuning parameter is greater than zero, then at least one of the threshold values is considered too high. Accordingly, the threshold values are adjusted for the next iteration. In particular, if the gain tuning parameter is greater than zero, the threshold values for the next iteration are selected from the lower sub-range 722. If the gain tuning parameter is less than zero, then at least one of the threshold values is considered too low. Accordingly, the threshold values for the next iteration are selected from the upper sub-range 722. If the gain tuning parameter is equal to zero, the threshold values are selected from the middle sub-range 722. Based on the gain tuning parameter, the selected sub-range serves as a new output power range 724 for the next iteration. In the next iteration, the new range (e.g., upper, lower, or middle sub-range) is further divided into smaller sub-ranges 716 and the calibration process is repeated until a completion condition is reached.

Figure 8:
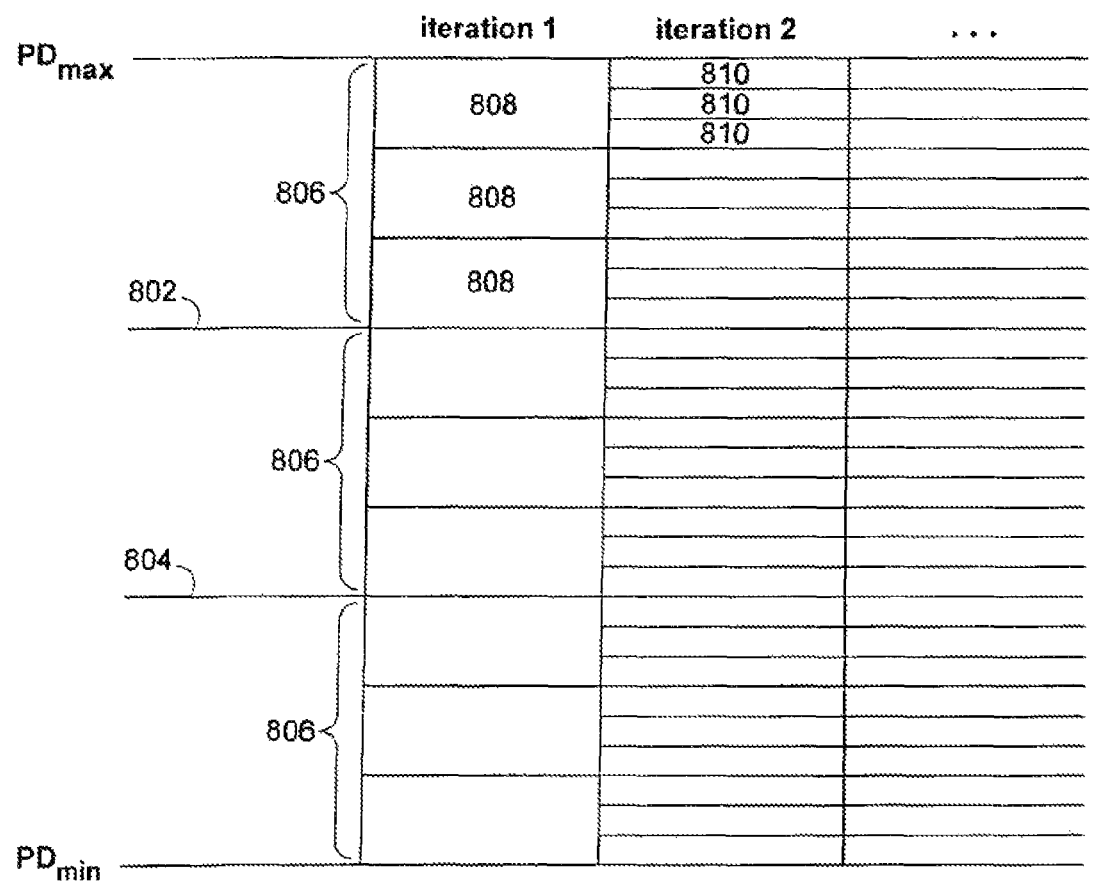
FIG. 8 is a graph of an exemplary progression that can be used to calibrate upper and lower power threshold values in accordance with FIG. 7B.

Referring now to FIG. 8, there is shown one embodiment of a predetermined progression for adjusting threshold values in accordance with the flow diagram of FIG. 7B. The graph of FIG. 8 shows divisions of the output power measurement range into equal portions of thirds 806. In the illustrated embodiment, the initial value for the upper power threshold 802 can be approximately $$\left[ PD_{min} + \frac{2}{3}(PD_{max} - PD_{min}) \right],$$

or one third of the way from $PD_{max}$ to $PD_{min}$, and the initial value for the lower power threshold 804 can be approximately $$\left[ PD_{min} + \frac{1}{3}(PD_{max} - PD_{min}) \right],$$

or one-third of the way from $PD_{min}$ to $PD_{max}$. Accordingly, the initial threshold values 802, 804 apportion the output power measurement range into thirds 806. In the next iteration (iteration one), each third 806 from the previous iteration is further apportioned into thirds 808, creating nine regions. The upper and lower threshold values in iteration one can correspond to the boundaries of one of the nine portions 808. In the next iteration (iteration two), each third 808 from the previous iteration is further apportioned to thirds 810, creating twenty-seven regions. The upper and lower threshold values in iteration two can correspond to the boundaries of one of the twenty-seven portions 810. In one embodiment, the progression of decreasing the difference between the upper and lower thresholds can progress for only a particular number of iterations, after which the upper and lower thresholds can maintain the same difference even if their values are adjusted. For example, in the illustration, the graph can maintain a maximum of twenty-seven regions 810 after iteration two. In one embodiment, a predetermined progression of threshold adjustments can be stored in a memory in the calibration circuit. In one embodiment, the predetermined progression can be implemented in hardware or by machine instructions operating on a processor. FIG. 8 is exemplary and variations and other progressions are contemplated. For example, each iteration need not have three equal regions. For example, based on a non-linear relationship between true output power and output power relationship, as shown in FIG. 2, the regions for lower output power measurements can be smaller and the regions for higher output power measurements can be larger, so that each region can approximately correspond to the same difference in true output power.

Figure 9:
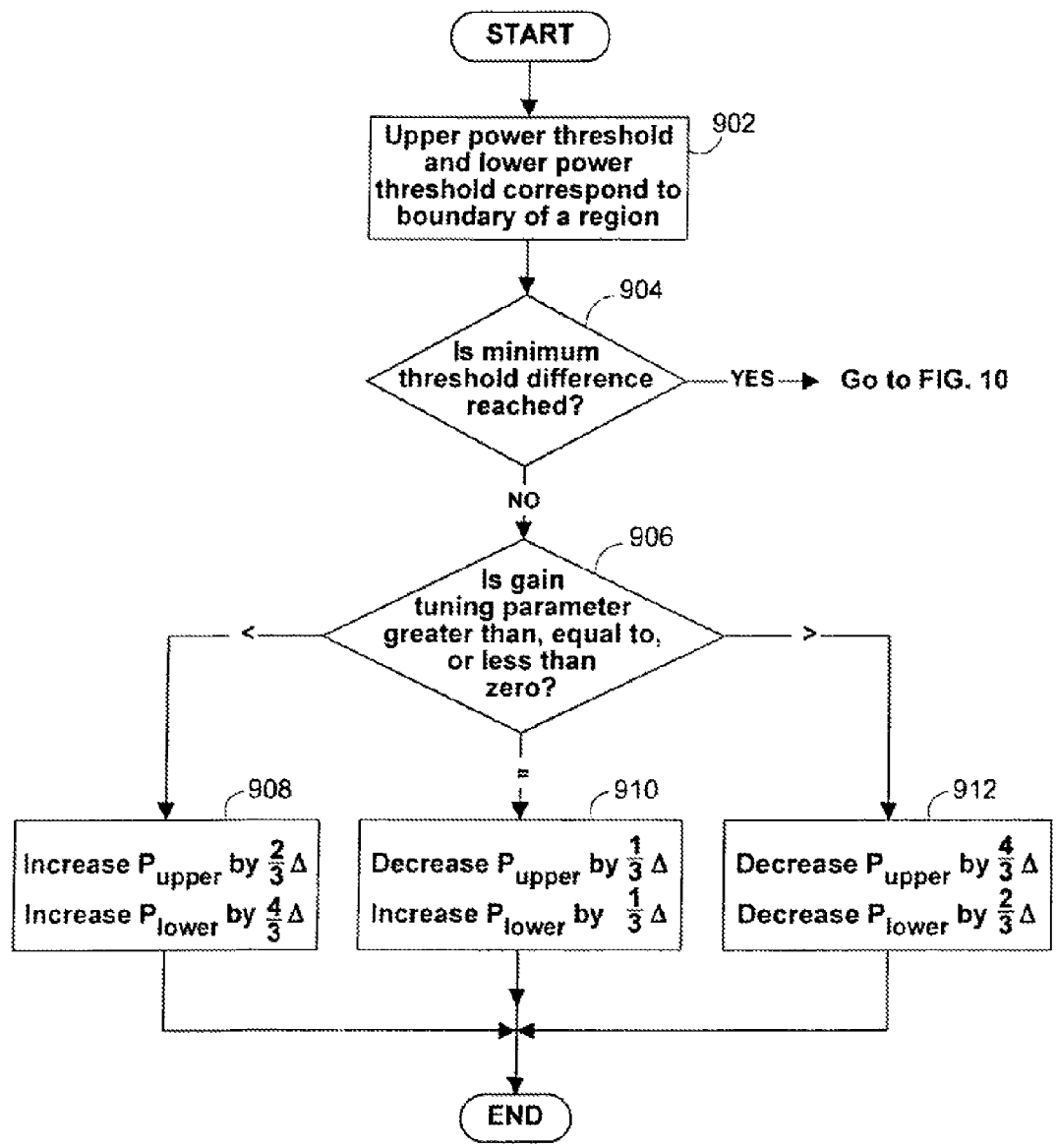
FIG. 9 is a flow diagram of one embodiment of adjusting upper and lower threshold values during calibration.
Figure 10:
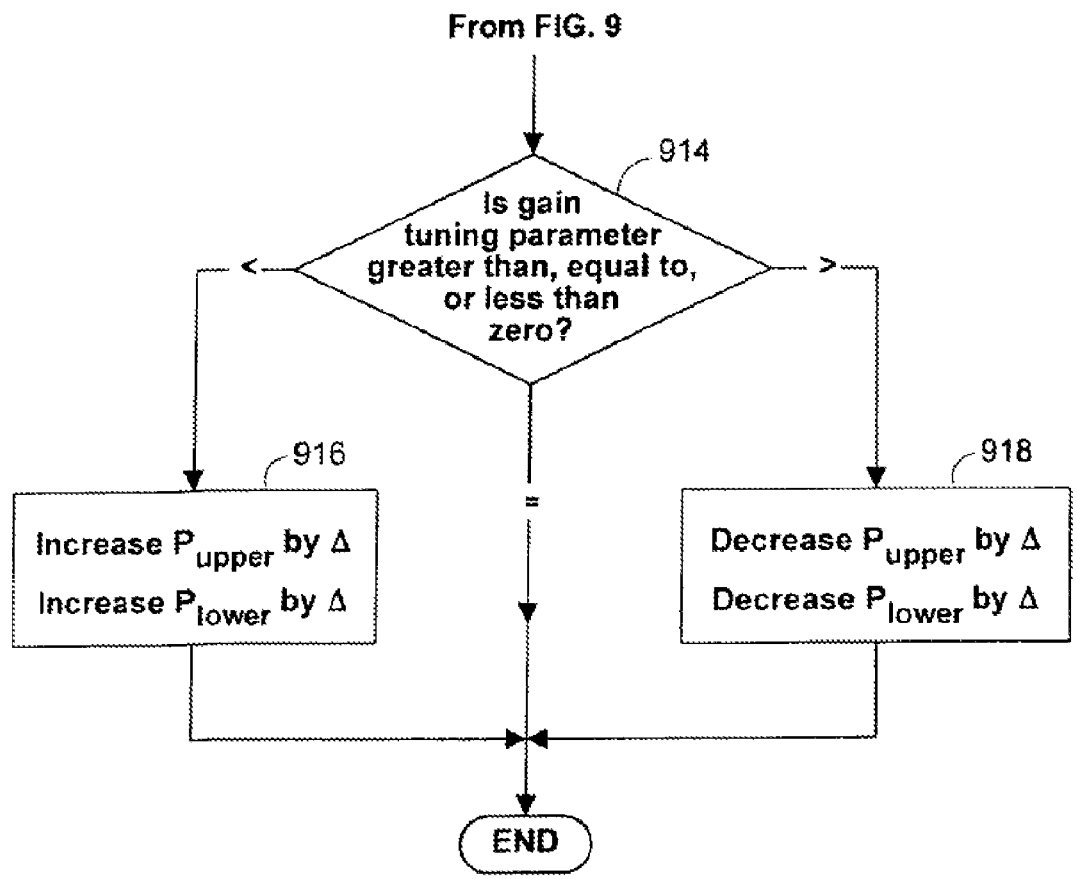
FIG. 10 is a flow diagram of one embodiment of adjusting upper and lower threshold values during calibration that is a continuation of FIG. 9.

FIGS. 9-10 illustrate one embodiment of adjusting upper and lower power thresholds according to the graph of FIG. 8. When the calibration block reaches the threshold adjustment procedure (710, FIG. 7A), the upper and lower power thresholds can correspond to the boundaries of a particular region 902. If the difference between the upper and lower thresholds have not reached a minimum difference 904, then the adjustment can further decrease the difference between the thresholds 908-812. If the difference between the upper and lower thresholds have reached a minimum difference 904, then the adjustment can change the thresholds without decreasing the difference between the thresholds (916, 918, FIG. 10).

If the difference between the upper and lower thresholds have not reached a minimum difference 904, the calibration block can determine if the gain tuning parameter is greater than, equal to, or less than zero 906. If the gain tuning parameter is less than zero 908, then the upper and lower thresholds are increased by $\frac{2}{3}\Delta$ and $\frac{4}{3}\Delta$, respectively, where $\Delta = P_{upper} - P_{lower}$. If the gain tuning parameter is equal to zero 910, then the upper power threshold is decreased by $\frac{1}{3}\Delta$ and the lower power threshold is increased by $\frac{1}{3}\Delta$. If the gain tuning parameter is greater than zero 912, then the upper and lower thresholds are decreased by ⅘Δ and ⅔Δ, respectively.

Referring now to FIG. 10, if the difference between the upper and lower thresholds have reached a minimum difference, the calibration block can determine if the gain tuning parameter is greater than, equal to, or less than zero 914. If the gain tuning parameter is less than zero 916, then the upper and lower thresholds are both increased by Δ. If the gain tuning parameter is greater than zero 918, then both the upper and lower thresholds are decreased by Δ. If the gain tuning parameter is equal to zero, then no change needs to be made and the calibration should be complete.

Figure 11:
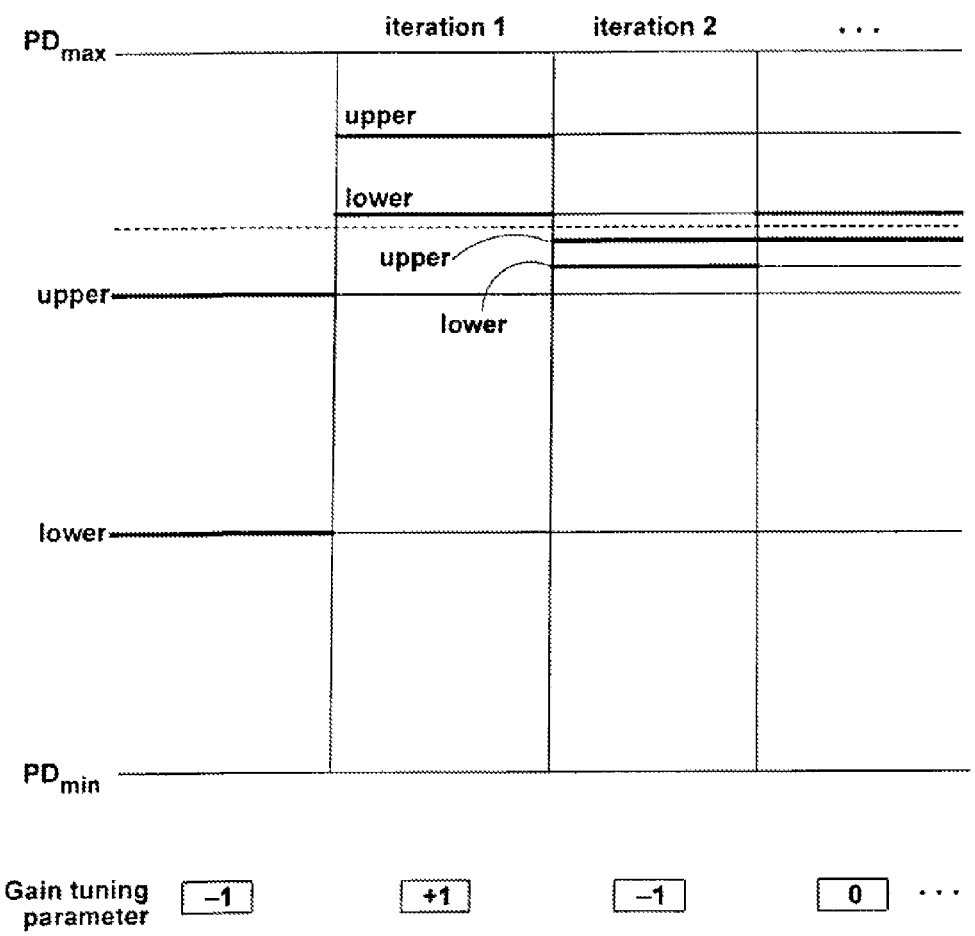
FIG. 11 is an exemplary progression of adjusted upper and lower power threshold values.

FIG. 11 shows an example of progressing through the calibration iterations in accordance with FIGS. 7A, 9 and 10. The dotted-line represents the desired output power measurement based on a calibrated default gain parameter and a gain tuning parameter value of zero. Initially, the upper and lower thresholds are set to the initial thresholds. The gain tuning parameter decreases by one step because the desired output power measurement is greater than the upper power threshold. The negative gain tuning parameter causes both the upper and lower thresholds to increase in accordance with FIG. 9, resulting in the threshold values shown in iteration one. In iteration one, the gain tuning parameter is reset to zero (704, FIG. 7A). Afterwards, the gain tuning parameter increases by one step because the desired output power measurement is less than the lower power threshold. The positive gain tuning parameter causes both the upper and lower thresholds to decrease in accordance with FIG. 9, resulting in the threshold values shown in iteration two. In iteration two, the gain tuning parameter is reset to zero (704, FIG. 7A). Afterwards, the gain tuning parameter decreases by one step because the desired output power measurement is greater than the upper power threshold. In the illustrated embodiment, the difference between the thresholds do not decrease after iteration two. Therefore, the negative gain tuning parameter in this iteration causes both the upper and lower thresholds to be adjusted in accordance with FIG. 10, as shown in iteration three, but their difference is maintained. The negative gain tuning parameter causes both the upper and lower thresholds to be increased in accordance with FIG. 10, as shown in iteration three. In iteration three, the gain tuning parameter is reset to zero (710, FIG. 7A). Afterwards, the gain tuning parameter stays at zero because the desired output power measurement is within the acceptable range. Accordingly, the high and lower thresholds are not adjusted and the calibration can end.

Accordingly, what has been described thus far are systems and methods for calibrating the control mechanism in a communication circuit to allow the communication circuit to maintain a desired true output power. A calibration circuit in the communication circuit calibrates a default gain parameter to provide a desired true output power that corresponds to a desired output power measurement. Then, the calibration circuit calibrates upper and lower power thresholds to provide an acceptable range of power variation around the desired output power measurement.

In accordance with one aspect of the invention, once calibration has been performed for a desired output power level, calibration need not be performed for other desired output levels for the same communication circuit. Rather, the parameters for other desired output power levels can be estimated using interpolation techniques and can be stored in the control circuit.

In one embodiment, the default gain parameter for other desired true output power levels can be computed based on a calibrated default gain parameter. For example, suppose a calibrated default gain parameter of 5.2 provides a true output power of twenty dBm, and the communication circuit is configured so that each 0.1 change in the default gain parameter corresponds to a 0.5 dBm change in the true output power. The default gain parameter can be computed for another true output power by direct computation. For example, if a second desired true output power is thirty dBm, then it can be computed that an increase in the default gain parameter of two will increase the true output power by ten dBm, resulting in a true output power of thirty dBm.

In one embodiment, upper and lower threshold values for another true output power level can also be computed. A linear interpolation technique can result in a poor estimate if the input-output relationship of the power detector circuit is non-linear (e.g., FIG. 2). In accordance with one aspect of the invention, upper and lower power thresholds for other desired power levels can be computed using a non-linear, relationship suitable for approximating the input-output relationship of the power detector circuit. Exemplary relationships include third order polynomials or higher-order polynomials.

Referring now to FIGS. 12A-12E, various exemplary implementations of the present invention are shown.

Figure 12A:
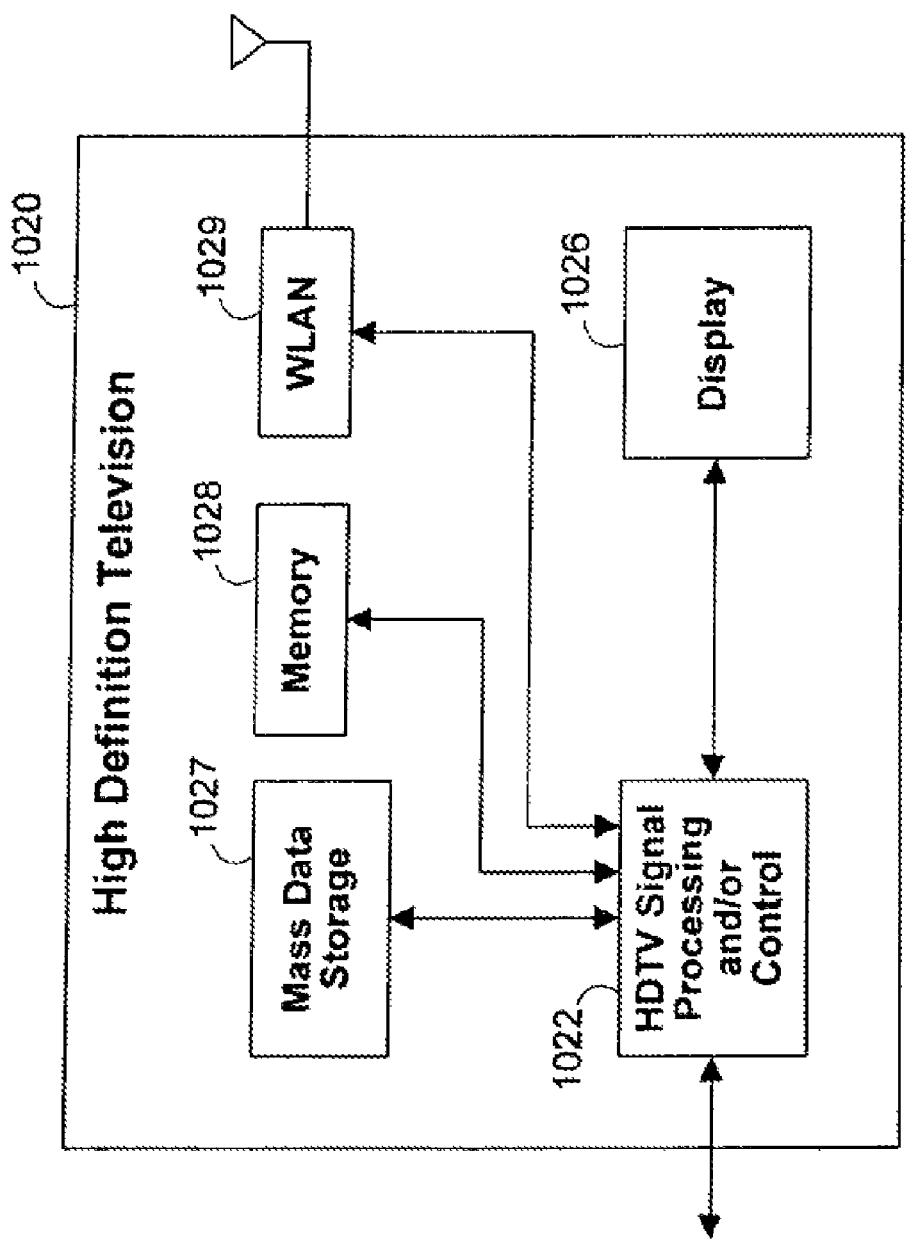
FIG. 12A is a block diagram of an exemplary high definition television that can employ the disclosed technology.

Referring now to FIG. 12A, the present invention can be implemented in a high definition television (HDTV) 1020. The present invention may implement either or both signal processing and/or control circuits, which are generally identified in FIG. 12A at 1022, a WLAN interface and/or mass data storage of the HDTV 1020. The HDTV 1020 receives HDTV input signals in either, a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 12B:
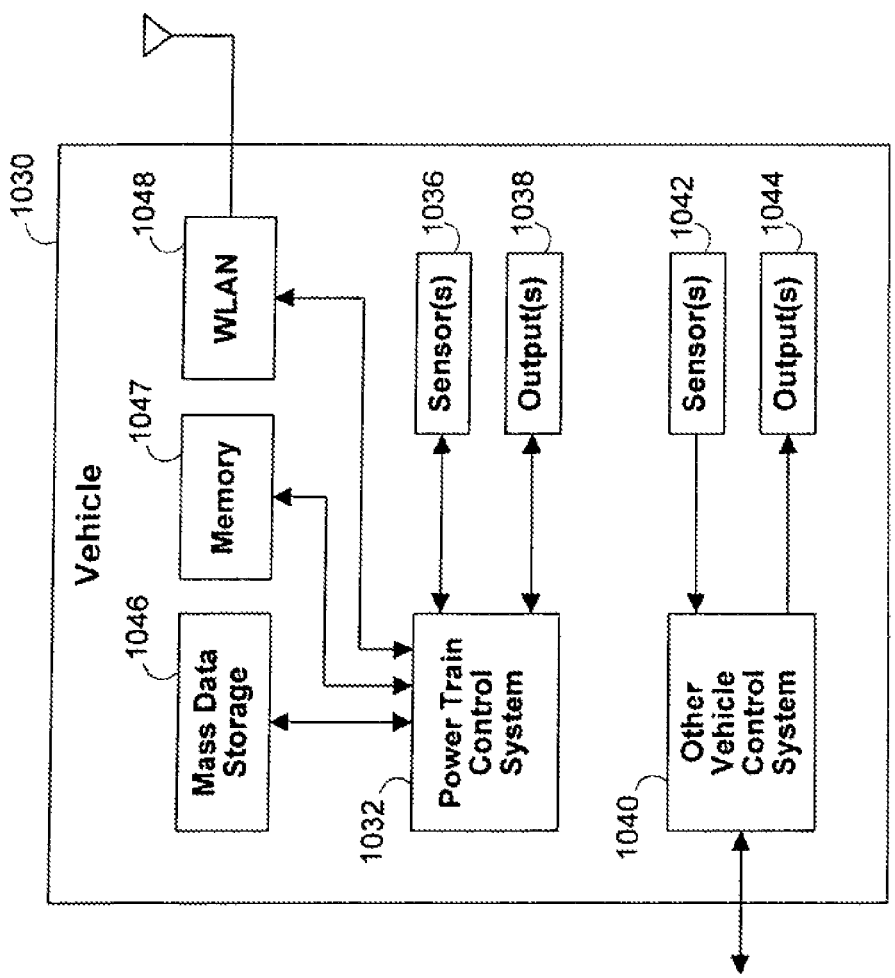
FIG. 12B is a block diagram of an exemplary vehicle that can employ the disclosed technology.

Referring now to FIG. 12B, the present invention implements a control system of a vehicle 1030, a WLAN interface and/or mass data storage of the vehicle control system. In some implementations, the present invention may implement a powertrain control system 1032 that receives inputs from one or more sensors such as temperature sensors; pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise, receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 12C:
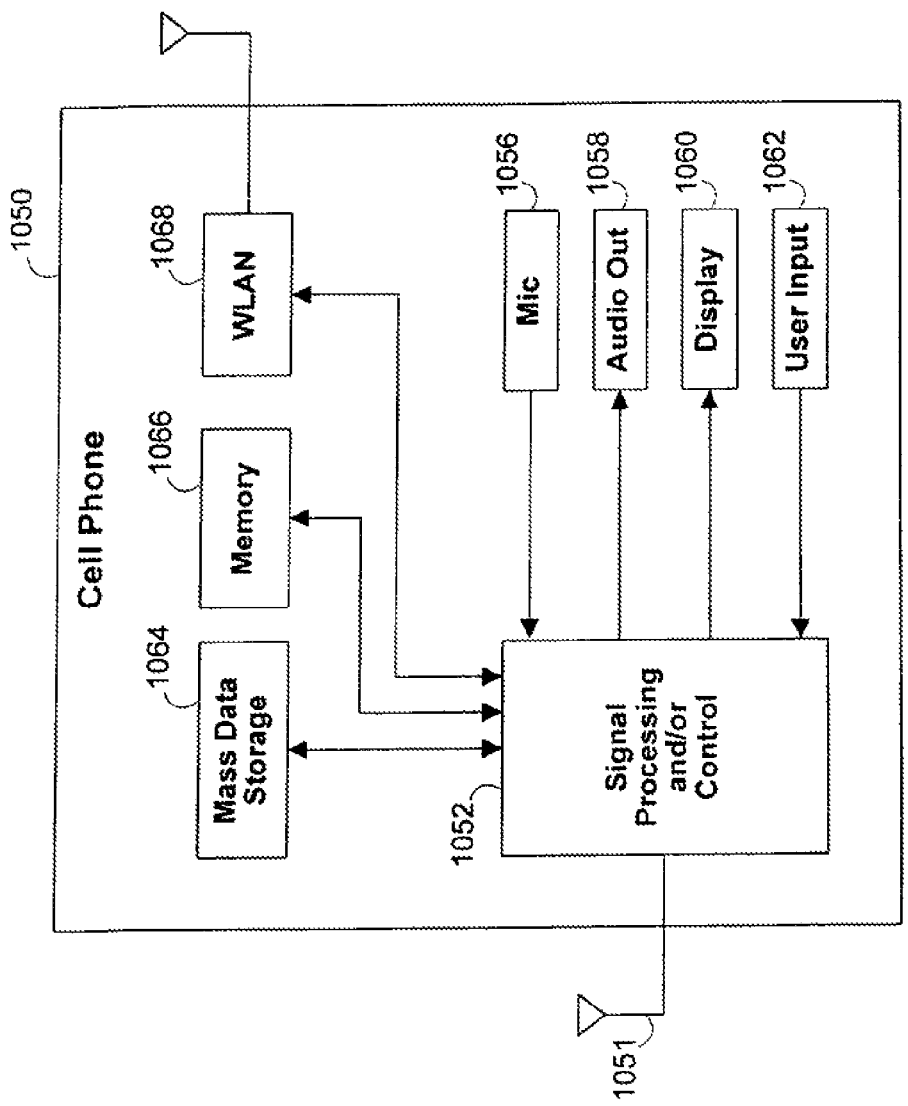
FIG. 12C is a block diagram of an exemplary cell phone that can employ the disclosed technology.

Referring now to FIG. 12C, the present invention can be implemented in a cellular phone 1050 that may include a cellular antenna 1051. The present invention may implement either or both signal processing and/or control circuits, which are generally identified in FIG. 12C at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 12D:
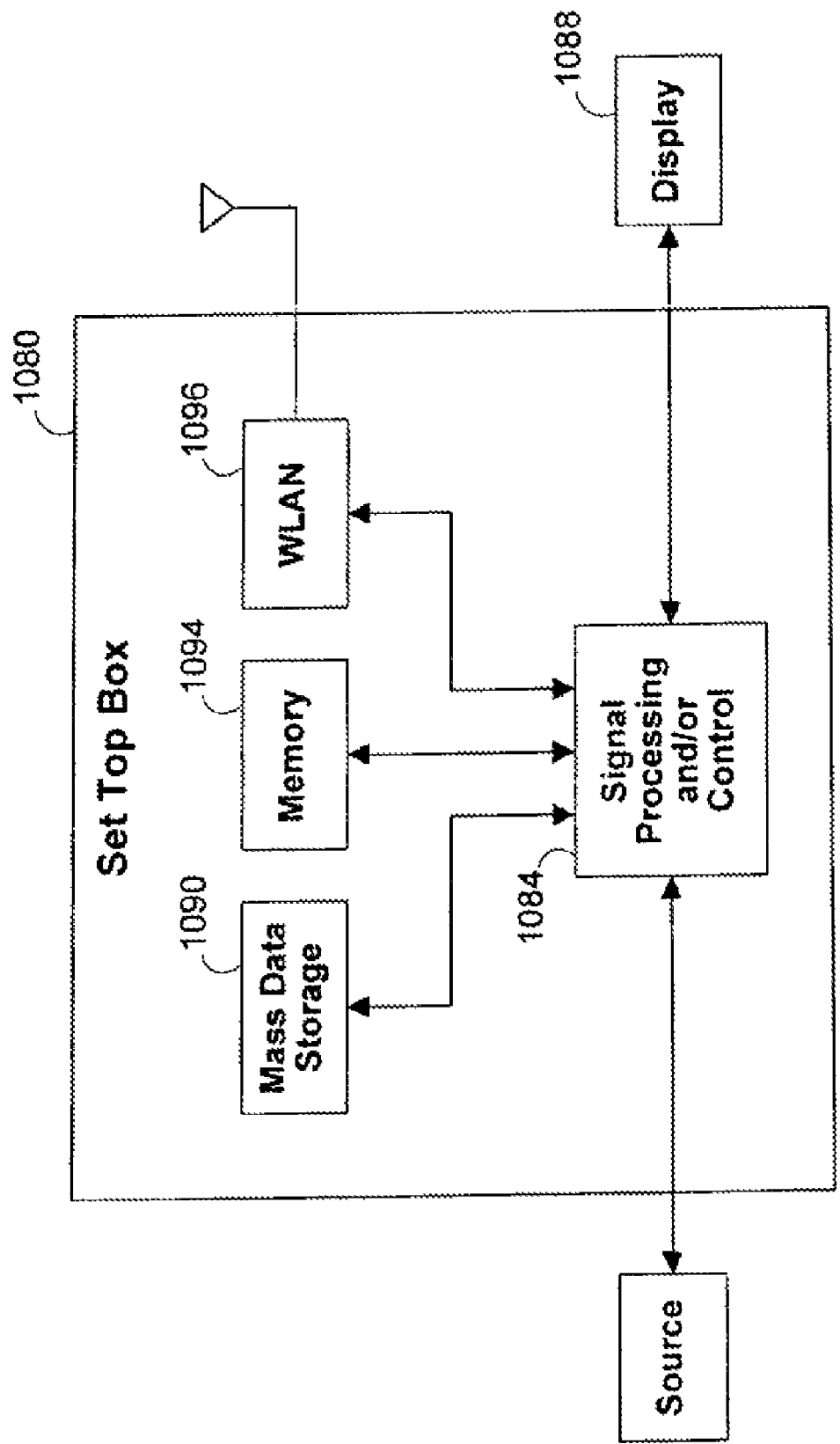
FIG. 12D is a block diagram of an exemplary set top box that can employ the disclosed technology.

Referring now to FIG. 12D, the present invention can be implemented in a set top box 1080. The present invention may implement either or both signal processing and/or control circuits, which are generally identified in FIG. 12D at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. The HDD may be a mini HDD that includes one or more platters having a diameter that is smaller than approximately 1.8". The set top box 1080 may be connected to memory 1094 such as RAM, ROM, low latency nonvolatile memory such as flash-memory and/or other suitable electronic data storage. The set top box 1080 also may support connections with a WLAN via a WLAN network interface 1096.

Figure 12E:
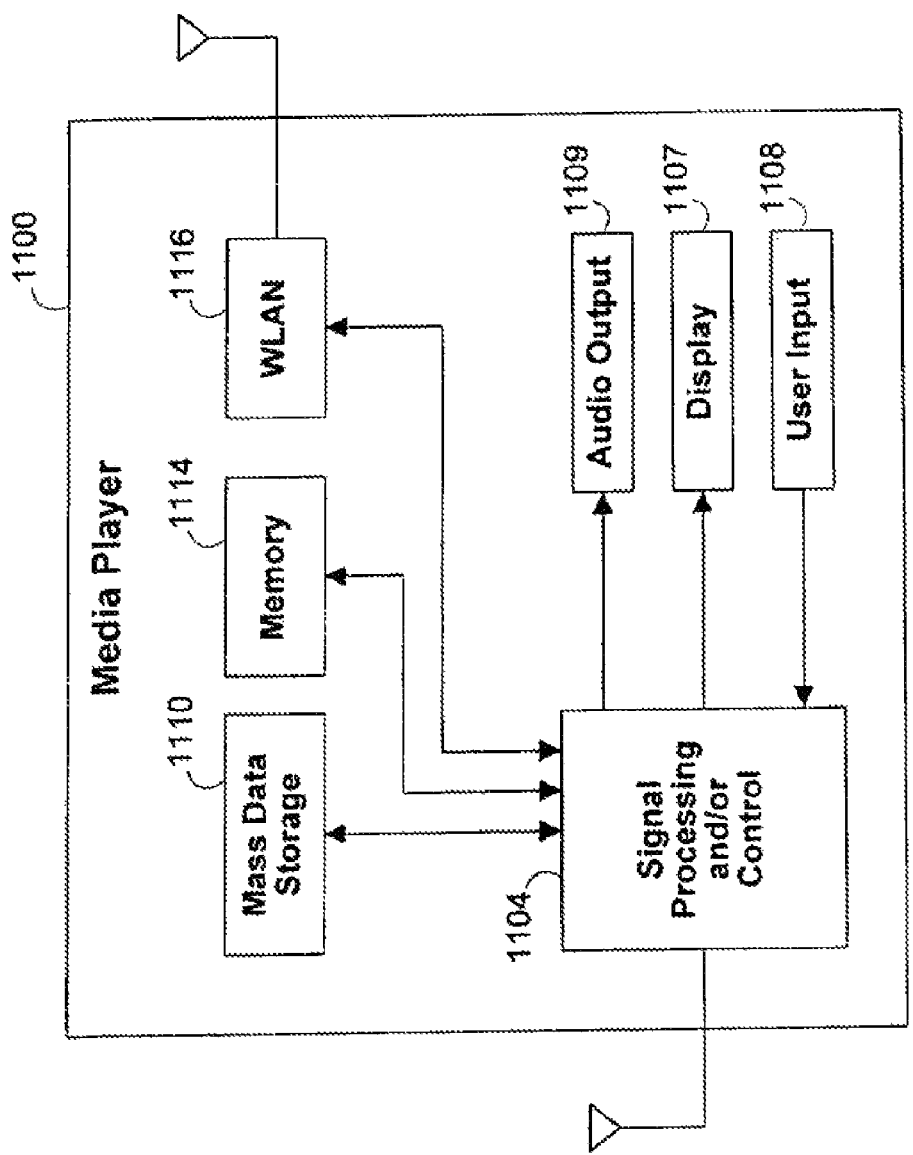
FIG. 12E is a block diagram of an exemplary media player that can employ the disclosed technology.

Referring now to FIG. 12E, the present invention can be implemented in a media player 1100. The present invention may implement either or both signal processing and/or control circuits, which are generally identified in FIG. 12E at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Accordingly, what have been described thus far are methods and systems for calibrating the control circuit of a communication circuit. The disclosed methods, components, and circuits can be implemented using various analog and digital circuit means, including circuitry made from various types, sizes, and/or configurations of transistors, MOS transistors, field effect transistors, BJTs, diodes, resistors, capacitors, inductors, integrated circuits, operation amplifiers, operational transconductance amplifiers, comparators, and/or current sources. The disclosed methods and circuits can also be implemented using a computing architecture having a processor and machine instructions executing on the processor. The disclosed embodiments and illustrations are exemplary and do not limit the scope of the disclosed invention as defined by the following claims.

What is claimed is:

1. A method for calibrating output power of communication circuitry that includes a gain tuning parameter and a feedback loop at the communication circuitry, wherein the gain tuning parameter adjusts the output power of the communication circuitry, the method comprising:

setting the gain tuning parameter to an initial tuning value;

enabling the feedback loop at the communication circuitry; and while the feedback loop is enabled, performing a plurality of iterations at the communication circuitry for adjusting the gain tuning parameter of the communication circuitry based on the output power of the communication circuitry and a previous interation of said gain tuning parameter.

2. The method of claim 1, wherein the communication circuitry further comprises a default gain parameter, the method further comprising:

disabling the feedback loop;

while the feedback loop is disabled:

setting the default gain parameter to a first value;

measuring the output power of the communication circuitry to provide a measurement of the output power;

comparing the output power measurement to a desired output power level; and setting the default gain parameter to a second value based on the comparison.

3. The method of claim 2, wherein the default gain parameter and the output power have a linear relationship, and wherein setting the default gain parameter to a second value based on the comparison comprises:

applying the relationship to a difference between the output power measurement and the desired output power level to provide a gain parameter difference; and applying the gain parameter difference to the default gain parameter to set the default gain parameter to the second value.

4. The method of claim 1, wherein adjusting the gain tuning parameter comprises adjusting the gain tuning parameter by a predetermined increment, wherein the predetermined increment corresponds to a predetermined amount of change in the output power of the communication circuitry.

5. The method of claim 1, further comprising performing the iterations for a predetermined number of iterations.

6. The method of claim 1, further comprising performing the iterations until the gain tuning parameter equals the initial tuning value.

7. A method of operating a television system comprising the method of claim 1.

8. A method of operating a cellular phone comprising the method of claim 1.

9. A method of operating a media player comprising the method of claim 1.

10. A calibration circuit for calibrating output power of communication circuitry that includes a default gain parameter, a gain tuning parameter, and a feedback loop at the communication circuitry that adjusts the gain tuning parameter, wherein the gain tuning parameter adjusts the output power of the communication circuitry, the calibration circuit comprising:

a tuning parameter access circuit in communication with the gain tuning parameter, wherein the tuning parameter access circuit operates to read the gain tuning parameter and to reset the gain tuning parameter to an initial value; and a tuning adjustment circuit in communication with the feedback loop at the communication circuitry, and the tuning parameter access circuit, wherein the tuning adjustment circuit performs a plurality of iterations at the communication circuitry that adjusts the gain tuning parameter, the tuning adjustment circuit comprising:

circuitry that enables the feedback loop at the communication circuitry;

circuitry that instructs the tuning parameter access circuit to reset the gain tuning parameter of the communication circuitry;

circuitry that configures the gain tuning parameter of the communication circuitry based on the output power measurement and a previous iteration of said gain tuning parameter;

circuitry that instructs the tuning parameter access circuit to read the gain tuning parameter of the communication circuitry.

11. The calibration circuit of claim 10, further comprising:

a connection that receives a measurement of the output power of the communication circuitry;

a default tuning adjustment circuit that includes a desired output power measurement and that is in communication with the feedback loop, the connection, and the default gain parameter, wherein the default tuning adjustment circuit comprises:

circuitry that disables the feedback loop;

circuitry that sets the default gain parameter to a first value;

circuitry that compares the measurement to the desired output power measurement; and circuitry that sets the default gain parameter to a second value based on the comparison.

12. The calibration circuit of claim 10, further comprising a power detector to provide a measurement of the output power to the tuning adjustment circuit.

13. The calibration circuit of claim 12, wherein the output power measurement is selected from the group consisting of a DC signal, a pseudo-DC signal, and a low frequency signal.

14. The calibration circuit of claim 11, further comprising a memory that includes a table of values corresponding to a linear relationship between the default gain parameter and the output power, wherein the default tuning adjustment circuit is in communication with the memory and further comprises:

circuitry that applies the linear relationship to a difference between the output power measurement and the desired output power measurement to provide a gain parameter difference; and circuitry that applies the gain parameter difference to the first value to provide the second value.

15. The calibration circuit of claim 10, wherein the tuning adjustment circuit is configured to iteratively adjust the gain tuning parameter for a predetermined number of iterations.

16. The calibration circuit of claim 10, wherein the tuning adjustment circuit is configured to iteratively adjust the gain tuning parameter until the gain tuning parameter equals zero.

17. A television system comprising the circuit of claim 10.

18. A cellular phone comprising the circuit of claim 10.

19. A media player comprising the circuit of claim 10.

* * * * *